United States Patent
Pan

(10) Patent No.: US 7,414,814 B1
(45) Date of Patent: Aug. 19, 2008

(54) DISK DRIVES, HEAD STACK, HEAD GIMBAL AND SUSPENSION ASSEMBLIES HAVING A COMPLIANT SUSPENSION TAIL DESIGN FOR SOLDER REFLOW

(75) Inventor: Tzong-Shii Pan, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 547 days.

(21) Appl. No.: 11/117,934

(22) Filed: Apr. 28, 2005

(51) Int. Cl.
*G11B 5/48* (2006.01)
*G11B 5/55* (2006.01)

(52) U.S. Cl. .................... 360/264.2; 360/245.9
(58) Field of Classification Search .......... 360/264.2, 360/245.8, 245.9
See application file for complete search history.

(56) References Cited

U.S. PATENT DOCUMENTS

| | | | | |
|---|---|---|---|---|
| 5,680,277 A * | 10/1997 | Bonn et al. | ............ | 360/264.2 |
| 5,909,342 A * | 6/1999 | Forbord et al. | .......... | 360/264.2 |
| 5,995,322 A * | 11/1999 | Yanagihara | ............ | 360/97.01 |
| 6,046,886 A * | 4/2000 | Himes et al. | ............ | 360/245.9 |
| 6,212,046 B1 * | 4/2001 | Albrecht et al. | .......... | 360/264.2 |
| 6,529,350 B1 * | 3/2003 | Itoh | ..................... | 360/264.2 |
| 6,809,905 B2 * | 10/2004 | Kilmer | ................ | 360/264.2 |
| 6,992,864 B2 * | 1/2006 | Kaneko et al. | .......... | 360/264.2 |
| 7,110,222 B2 * | 9/2006 | Erpelding | ............ | 360/264.2 |
| 7,227,725 B1 * | 6/2007 | Chang et al. | ........... | 360/264.2 |
| 2004/0228038 A1 | 11/2004 | Nakamura et al. | | |
| 2004/0257708 A1 | 12/2004 | Erpelding | | |
| 2005/0013055 A1 * | 1/2005 | Ho et al. | ................. | 360/264.2 |
| 2006/0012921 A1 * | 1/2006 | Kubota et al. | .......... | 360/264.2 |

\* cited by examiner

*Primary Examiner*—Brian E. Miller
(74) *Attorney, Agent, or Firm*—Young Law Firm

(57) ABSTRACT

A suspension assembly for a disk drive includes a load beam and a flexure. The flexure has a first end including a plurality of bond pads for electrical connection to a slider and a second end having a tail for attachment to a flexible cable. The tail includes a support layer having a free end defining cutouts forming a plurality of peninsula-shaped regions, such that a plane oriented perpendicular to the support layer and disposed between the peninsula-shaped regions and extending beyond the free end of the tail does not cut through any support layer material. An insulating layer may be disposed on the support layer. A connection pad may be disposed on the insulating layer on each of the peninsula-shaped regions. Conductive traces may be disposed on the insulating layer to electrically connect each connection pad to a corresponding bond pad. A head is coupled to the bond pads.

4 Claims, 5 Drawing Sheets

DISK DRIVES, HEAD STACK, HEAD GIMBAL AND SUSPENSION ASSEMBLIES HAVING A COMPLIANT SUSPENSION TAIL DESIGN FOR SOLDER REFLOW

FIELD OF THE INVENTION

The present invention relates to disk drives. More particularly, the present invention relates to disk drives having a suspension assembly that includes a flexure having an improved tail portion for connection to a flexible cable.

BACKGROUND

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a head having a slider and at least one transducer or read/write element for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the slider toward the disk; and (3) a flex cable assembly that provides an electrical interconnect with minimal constraint on movement.

A typical HGA includes a load beam, a flexure (also called a gimbal) attached to an end of the load beam, and a head attached to the flexure. The load beam has a spring function that provides a "gram load" biasing force and a hinge function that permits the air bearing surface of the slider to follow the surface contour of the spinning disk. The load beam has an actuator end that connects to the actuator arm and a flexure end that connects to the flexure that supports the head and transmits the gram load biasing force to the head to "load" the slider against the disk. Air near the spinning disk is drawn between the air bearing surface of the slider and the disk, developing regions of super-ambient pressure beneath the surface of the slider that push the slider slightly away from the disk in opposition to the gram load biasing force. The slider is said to be "flying" over the disk when in this state.

Early HGAs included a number of twisted wires within a tube attached to a side of the actuator arm to electrically couple the slider to the preamplifier. However, more recent developments in the disk drive industry, such as the continuing miniaturization of slider assemblies (including the head and the transducer) and the transition to magnetoresisitive (MR) heads that require more electrical connections, have led to abandoning such configurations in favor of a configuration in which conductive traces are laid on a polyimide film formed on or coupled to the flexure. Such technologies are variously named TSA (Trace Suspension Assembly), CIS (Circuit Integrated Suspension), FOS (Flex on Suspension) and the like. Whatever their differences, each of these technologies replaces the discrete twisted wires with conductive traces (copper, for example) and insulating material (such as polyimide, for example) and support or cover layers (including stainless steel, for example). These conductive traces interconnect the transducer elements of the head to the drive preamplifier and the circuits associated therewith.

The HSA is internal to the HDA in a very clean environment within the drive. The PCBA, however, is outside the HDA—and outside of the clean environment. One problem faced by hard disk drive designers is how best to electrically connect the HSA to the PCBA without compromising the clean environment of the HDA, and to do so in a reliable, readily manufacturable and inexpensive manner. The head stack in a disk drive rotates around a pivot axis, and a flat flexible cable is required to allow for the pivot motion while maintaining the electrical connection. This requirement places the major surfaces of the flat flexible cable in a vertical orientation.

That portion of the flexure that attaches to the flex cable is commonly called the tail. There are three commonly used approaches to attach the flexure tail to the flexible cable. These are ultrasonic wire bond, solder reflow, and anisotropic conduct film. Of these, the ultrasonic wire bond and solder reflow approaches are most popular. An important difference is that pressure is applied to the joint when joining the suspension tail to the flex cable using the ultrasonic wire bond technique, whereas only heat is applied to the joint using the solder reflow technique. Due to suspension design miniaturization and the increase in the number of conductor leads, the tail termination pads on which the solder bumps are disposed have and should continue to become much smaller in size. To maintain equivalent joint strength and keep manufacturing robustness, non-contact solder reflow is getting more attention and is implemented by more head stack assembly suppliers.

Solder reflow can be achieved either in plane (such as that in flip-chip) or in 90 degree (solder fillet). For the solder reflow in the 90 degree configuration, the contact pressure and compliance of the tail portion against the flexible cable will create a preload which will force the solder bump on flexure tail against the flexible cable pad or solder bump. This preloading force helps to insure a good solder joint after solder reflow. However, edge irregularities or stacking tolerances might cause some pads to contact while preventing other pads on the tail portion of the flexure from making good contact with the corresponding pad or solder bump on the flex cable.

FIG. 1A is a plan view of elements of a conventional head stack assembly. As shown therein, the head stack assembly includes an actuator arm 102, to which a load beam 103 is attached. A flexure 106 including a plurality of conductive traces is at least partially supported by the load beam 103. FIG. 1A also shows the tail portion 108 of the flexure 106. The flexure may have a laminar construction, in which the conductive traces are disposed on an insulating layer that is, in turn, disposed on a support layer. FIG. 1B shows the outline of the support layer 110 of the tail portion 108 of the flexure 106 of FIG. 1A. As may be seen in FIG. 1B, the tail supports the connection pads (shown in outline form in FIG. 1B), which are configured to connect to corresponding pads on the flexible cable, to connect the head stack assembly to the PCBA. As seen in FIG. 1C, the connection pads 118 are disposed on an insulating layer 114, which is layered on the support layer 110. The support layer 110 of the tail 108 defines a plurality of small projections 111. However, the connection pads 118 and the solder bumps 120 disposed thereon are disposed on a single continuous and homogeneous slab of support material. Should the aforementioned edge irregularities and stacking tolerances be too great, one or more of the solder bumps 120 may be unable to make a good contact with corresponding solder bumps on the mating portion of the flexible cable. As the number of contacts within the suspension tail-flexible cable interface increases, it becomes increasingly difficult to control the height of the solder bumps 120 to insure uniformity. Ultrasonic tab bonding techniques become more difficult to carry out as well, as the number of wires increase and the spacing therebetween correspondingly decreases.

FIG. 2A shows elements of a conventional flexure tail such as shown, for example, in published patent application US 2004/0257708 A1. As shown in FIG. 2A, the support layer 202 defines a bounded and enclosed cutout region 203 into which project a plurality of fingers 204. FIG. 2B shows an imaginary plane 208 that is oriented perpendicularly relative to the support layer 202 and disposed between adjacent ones of the fingers 204. As shown, the plane 208 extends beyond the free end of the tail. In so doing, the plane 208 cuts through the support layer material 202, both through the support layer material at the free end of the tail portion and through the support layer 202 that extends between adjacent fingers 204. Such a construction, however, may be better suited to plated solder, and may not be capable of screen solder application, due to small footprint of the support material 202 defining the fingers 204. Moreover, although the fingers 204 operate as individual springs or gimbals, the supporting leading portion 206 of the tail will still contact to the flex cable as a whole, which may limit the compliance of the individual fingers 204.

From the foregoing, it may be appreciated that improved disk HSAs, HGAs, suspensions and disk drives are needed that are well suited to solder reflow (i.e., non-contact) bonding techniques and that are readily scalable to accommodate a greater number of smaller conductive traces. Such improved suspensions and suspension containing device should not require expensive retooling and should allow a preload of the solder bumps or connection pads against the corresponding structures on the flexible cable, to insure a good electrical contact between the two structures prior to the application of heat to cause the solder reflow. Moreover, in view of the decreasing size and separation between adjacent tail connection pads in new and forthcoming drive designs, such improved suspensions should allow ready use of solder reflow and/or other non-contact bonding techniques.

SUMMARY

According to an embodiment of the present invention, a suspension assembly for attaches to an actuator arm of a head stack assembly in a disk drive and for supporting a slider. According to this embodiment, the suspension assembly includes a load beam and a flexure at least partially supported by the load beam and having a first end that includes a plurality of bond pads configured for electrical connection to the head; a second end that defines a tail configured for attachment to a flexible cable attached to the actuator arm assembly. The tail may include a support layer having a free end that defines a plurality of cutouts to form a plurality of peninsula-shaped regions, such that a plane oriented perpendicularly relative to the support layer and disposed between adjacent ones of the plurality of peninsula-shaped regions and extending beyond the free end of the tail does not cut through any support layer material; a layer of insulating material disposed on the support layer; a plurality of connection pads, each being disposed on the layer of insulating material within a corresponding one of the plurality of peninsula-shaped regions; a plurality of conductive traces disposed on the layer of insulating material to electrically connect each of the plurality of connection pads to a corresponding one of the plurality of bond pads at the first end of the flexure.

According to another embodiment of the present invention, a head gimbal assembly attaches to a head stack assembly of a disk drive, the head stack assembly including a body portion and an actuator arm cantilevered from the body portion. The head gimbal assembly may include a load beam coupled to the head stack assembly; a flexure at least partially supported by the load beam and including: a first end that includes a plurality of bond pads configured for electrical connection to the head; a second end that defines a tail configured for attachment to a flexible cable attached to the actuator arm assembly. The tail may include a support layer having a free end that defines a plurality of cutouts to form a plurality of peninsula-shaped regions, such that a plane oriented perpendicularly relative to the support layer and disposed between adjacent ones of the plurality of peninsula-shaped regions and extending beyond the free end of the tail does not cut through any support layer material; a layer of insulating material disposed on the support layer; a plurality of connection pads, each being disposed on the layer of insulating material within a corresponding one of the plurality of peninsula-shaped regions; a plurality of conductive traces disposed on the layer of insulating material to electrically connect each of the plurality of connection pads to a corresponding one of the plurality of bond pads at the first end of the flexure, and a slider coupled to the plurality of bond pads for reading and writing to the disk.

According to another embodiment of the present invention, a head stack assembly for a disk drive includes a body portion; an actuator arm cantilevered from the body portion; a head gimbal assembly supported by the actuator arm and including: a load beam; a flexure at least partially supported by the load beam and including: a first end that includes a plurality of bond pads configured for electrical connection to the head; a second end that defines a tail configured for attachment to a flexible cable attached to the actuator arm assembly. The tail may include a support layer having a free end that defines a plurality of cutouts to form a plurality of peninsula-shaped regions, such that a plane oriented perpendicularly relative to the support layer and disposed between adjacent ones of the plurality of peninsula-shaped regions and extending beyond the free end of the tail does not cut through any support layer material; a layer of insulating material disposed on the support layer; a plurality of connection pads, each being disposed on the layer of insulating material within a corresponding one of the plurality of peninsula-shaped regions; a plurality of conductive traces disposed on the layer of insulating material to electrically connect each of the plurality of connection pads to a corresponding one of the plurality of bond pads at the first end of the flexure, and a slider coupled to the plurality of bond pads for reading and writing to the disk.

According to a still further embodiment of the present invention, a disk drive comprises: a disk; a head stack assembly, comprising: a body portion; an actuator arm cantilevered from the body portion; a head gimbal assembly supported by the actuator arm and including: a load beam; a flexure at least partially supported by the load beam and including: a first end that includes a plurality of bond pads configured for electrical connection to the head; a second end that defines a tail configured for attachment to a flexible cable attached to the actuator arm assembly. The tail may include a support layer having a free end that defines a plurality of cutouts to form a plurality of peninsula-shaped regions, such that a plane oriented perpendicularly relative to the support layer and disposed between adjacent ones of the plurality of peninsula-shaped regions and extending beyond the free end of the tail does not cut through any support layer material; a layer of insulating material disposed on the support layer; a plurality of connection pads, each being disposed on the layer of insulating material within a corresponding one of the plurality of peninsula-shaped regions; a plurality of conductive traces disposed on the layer of insulating material to electrically connect each of the plurality of connection pads to a corresponding one of the plurality of bond pads at the first end of the flexure, and a slider coupled to the plurality of bond pads for reading and writing to the disk.

DESCRIPTION OF THE PREFERRED EMBODIMENTS

Figure 3A:
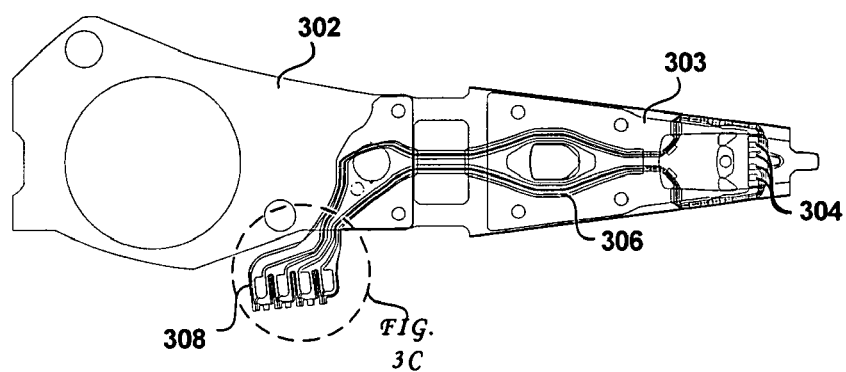
FIG. 3A is a plan view of a portion of a head stack and a suspension assembly according to an embodiment of the present invention.
Figure 3B:
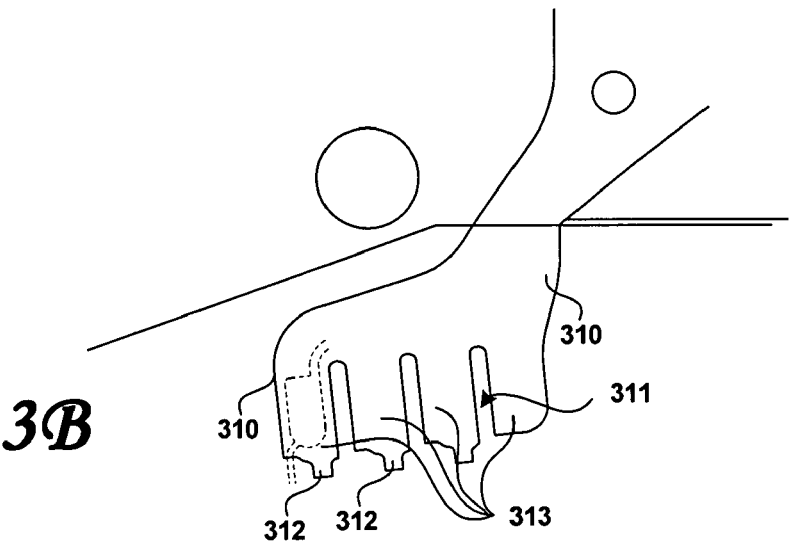
FIG. 3B shows the support layer of the tail portion of the flexure of the suspension assembly of FIG. 3A, that defines the plurality of peninsula-shaped regions according to an embodiment of the present invention.
Figure 3C:
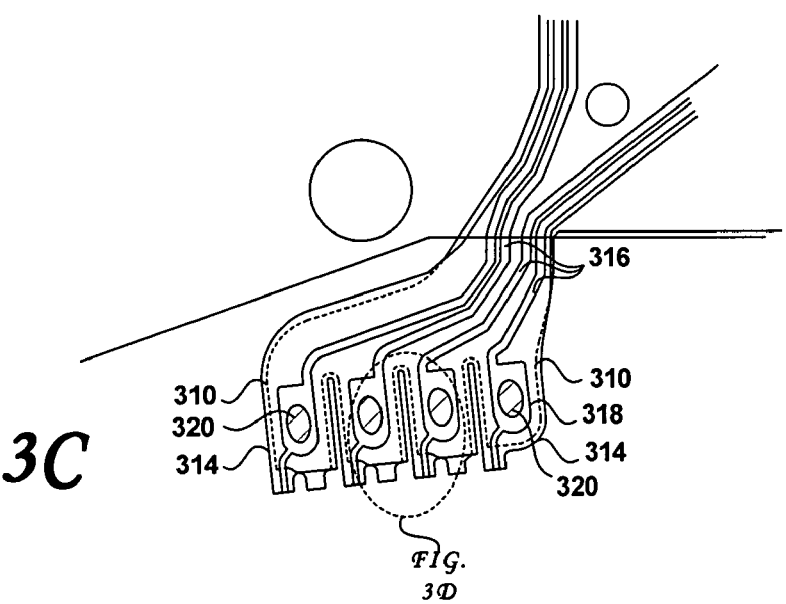
FIG. 3C shows the tail portion of the flexure of FIG. 3A.

FIG. 3A is a plan view of a portion of a head stack and a suspension assembly according to an embodiment of the present invention. FIG. 3B shows the support layer of the tail portion of the flexure of the suspension assembly of FIG. 3A and FIG. 3C shows the tail portion of the flexure of FIG. 3A. FIG. 3A shows an actuator arm 302 from which extends a load beam 303. At least partially supported by the load beam 303 is a flexure 306 that includes conductive traces 316 that carry signals from the slider coupled to the bond pads 304 to corresponding connection pads 318 disposed within the tail portion 308 of the flexure 306. According to an embodiment of the present invention, the tail 308 may have a laminar structure that includes a support layer 310 including, for example, stainless steel. A layer of insulating material 314 (FIG. 3C) including, for example, polyimide, may be disposed on the support layer 310. A plurality of conductive traces 316 terminating in a like number of connection pads 318 may then be formed (through deposition and selective etching, for example) on the layer 314 of insulating material. Lastly, a solder bump 320 may be disposed on each of the connection pads 318, to form an electrical connection with corresponding solder bumps on the flexible cable, through a reflow process, for example.

Figure 3D:
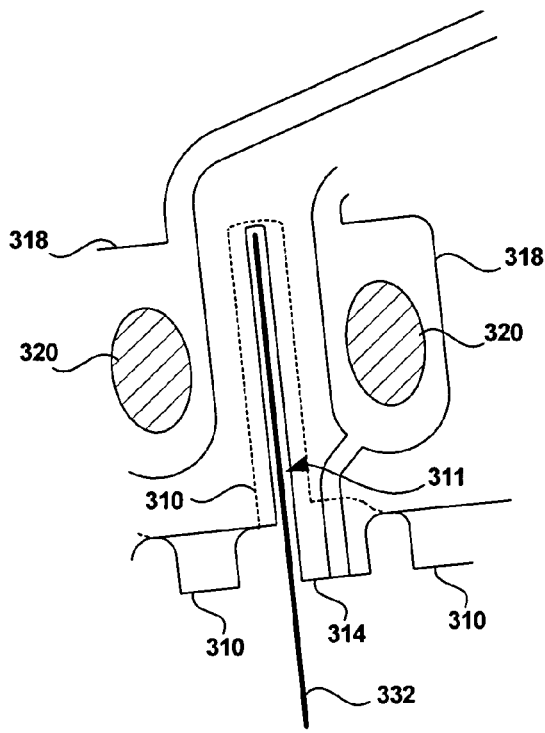
FIG. 3D is a detail view of a portion of the tail shown in FIG. 3C.

Specifically, according to an embodiment of the present invention, the flexure may include a first end that includes a plurality of bond pads 304 configured for electrical connection to a slider (not shown in FIG. 3A). The flexure may also include a second end that defines a tail 308 that is configured for attachment to a flexible cable 580 (see FIGS. 4 and 5) attached to the actuator arm assembly. The tail 308 may include a support layer 310 that has a free end that defines a plurality of cutouts 311 that collectively form a plurality of peninsula-shaped regions 313. A layer of insulating material 314 may be disposed (e.g., deposited and patterned or etched) on the support layer 310 while maintaining at least a portion of the cutouts 311 free of insulating material, as shown in FIG. 3C. A plurality of conductive traces 316 may be formed on the layer 314 of insulating material and the conductive traces may be terminated within the tail 308 by connection pads 318. The conductive traces 316 electrically connect the connection pads 318 with the bond pads 304 at the first end of the flexure. The cutouts defined within the tail 308 may be such that a plane (reference number 332, seen edge-on in FIG. 3D) oriented perpendicularly relative to the support layer 310 and disposed between adjacent ones of the plurality of peninsula-shaped regions 313 and extending beyond the free end of the tail does not cut through any support layer material 310.

Figure 1A:
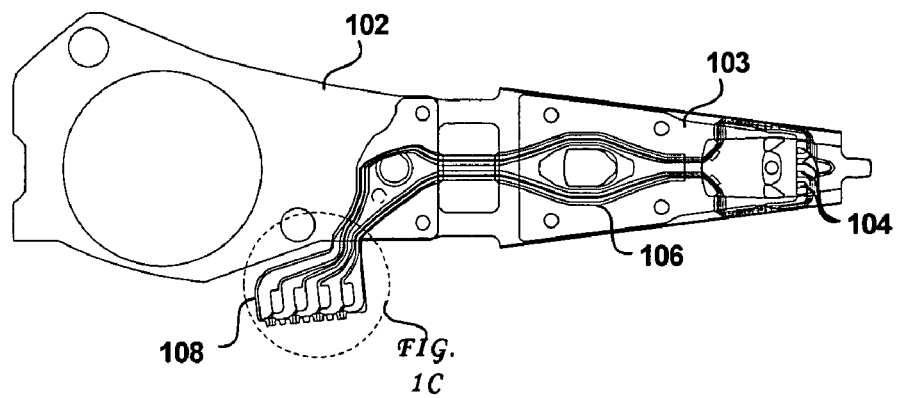
FIG. 1A is a plan view of elements of a conventional head stack assembly.
Figure 1B:
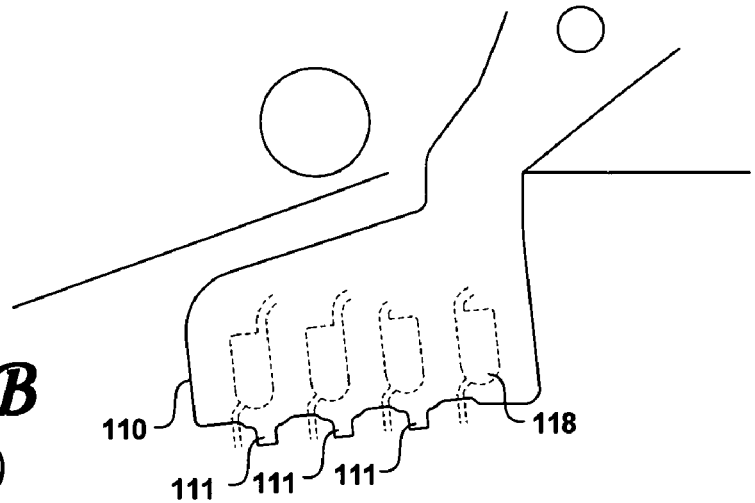
FIG. 1B is a detail view of the support layer portion of the tail portion of the flexure of the conventional head stack assembly of FIG. 1A.
Figure 1C:
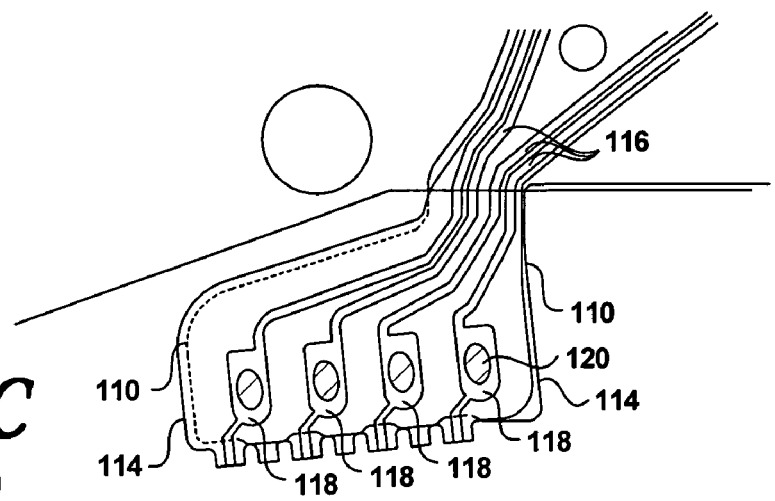
FIG. 1C shows a detail view of the tail portion of the flexure of the conventional head stack assembly of FIG. 1A.
Figure 2A:
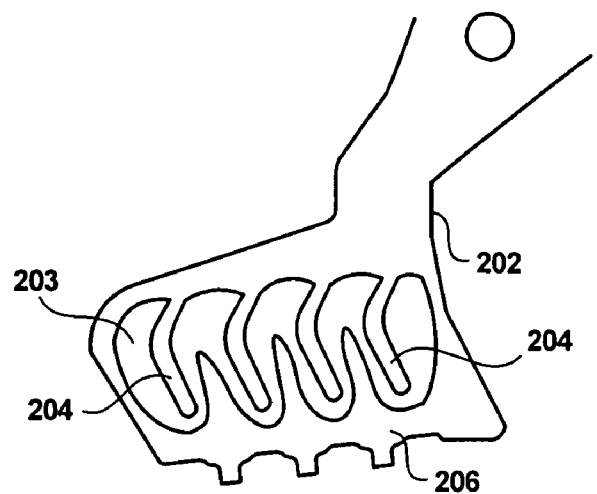
FIG. 2A shows elements of a tail portion of another flexure of a conventional head stack assembly.
Figure 2B:
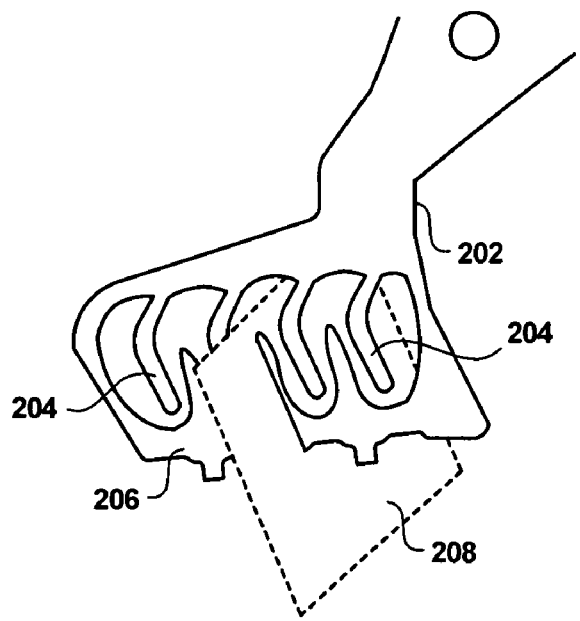
FIG. 2B shows the manner in which an imaginary plane cuts across the support layer material of the tail portion of the conventional flexure of FIG. 2A, to illustrate further structural features thereof.

By virtue of the peninsula-shaped regions 313 in the embodiment of FIG. 3B, the connection pads 318 and/or the solder bumps 320 disposed thereon may bend away from the plane of the tail 308, to thereby exert a preload force against the corresponding connection pads and/or solder bumps on the flexible cable. By allowing the cantilevered peninsula-shaped regions 313 to elastically bend away from the plane of the tail 308, small differences in the heights of the solder bumps of either or both the tail and the flexible cable may be effectively compensated. This embodiment of the present invention is well adapted to screen solder applications. Moreover, unlike the conventional tail of FIGS. 2A and 2B, the support layer 310 in the embodiment of FIG. 3B does not define a bounded and enclosed cutout region into which the peninsula-shaped regions 313 project. Instead, the cutout 311 defined within the tail portion 308 define peninsula shaped regions 313 that collectively define the free end of the tail 308, instead of defining a closed and bounded region. Therefore, there is no supporting portion (such as leading supporting portion 206 in FIGS. 2A and 2B) of the tail that can contact the flex cable 580. Consequently, the compliance of the peninsula-shaped regions 313 may remain high, and unimpeded by such a supporting portion.

Figure 4:
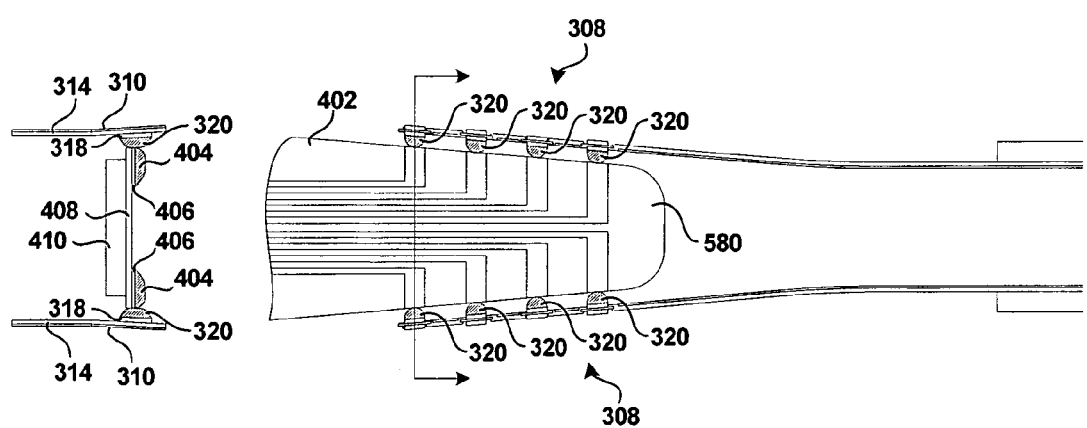
FIG. 4 shows a plan and cross-sectional view of the head stack and flexures mated to a flexible cable, according to an embodiment of the present invention.

FIG. 4 shows a plan and a cross-sectional view of the head stack and suspension assemblies mated to a flexible cable 580, according to an embodiment of the present invention. As shown, the tail 308 may be mated to the flexible cable 580 such that the tail 308 and the flat surface of the flexible cable are at (about) a ninety degree angle. The flexible cable 580 may also have a laminar structure, including, for example, a stiffener layer 410 and insulator layer 408, on which the flexible cable connection pads 406 may be formed. Disposed on these connection pads 406 are the flexible cable solder bumps 404. When the tail 308 and the flexible cable 580 are aligned for mating, the connection pads 406 of the flexible cable 580 align with corresponding ones of the connection pads 318 of the tail 308, and the solder bumps 404 of the flexible cable 580 align with corresponding ones of the solder bumps 320 of the tail 308, as shown in the cross-sectional view of FIG. 4. In this configuration, heat may be applied to the solder bumps 320, 404 (by means of a laser, for example) and the solder bumps 320, 404 caused to reflow to form a single electrical connection between the respective connection pads of the tail 308 and of the flexible cable 580. Because the peninsula-shaped regions 313 enable the connection pads to freely move (e.g., bend) relative to each other and relative to the remainder of the tail 308, a sufficient preloading force is applied to the solder bumps before and during reflow, thereby insuring a good electrical contact between the tail 308 and the flexible cable 580.

Figure 5:
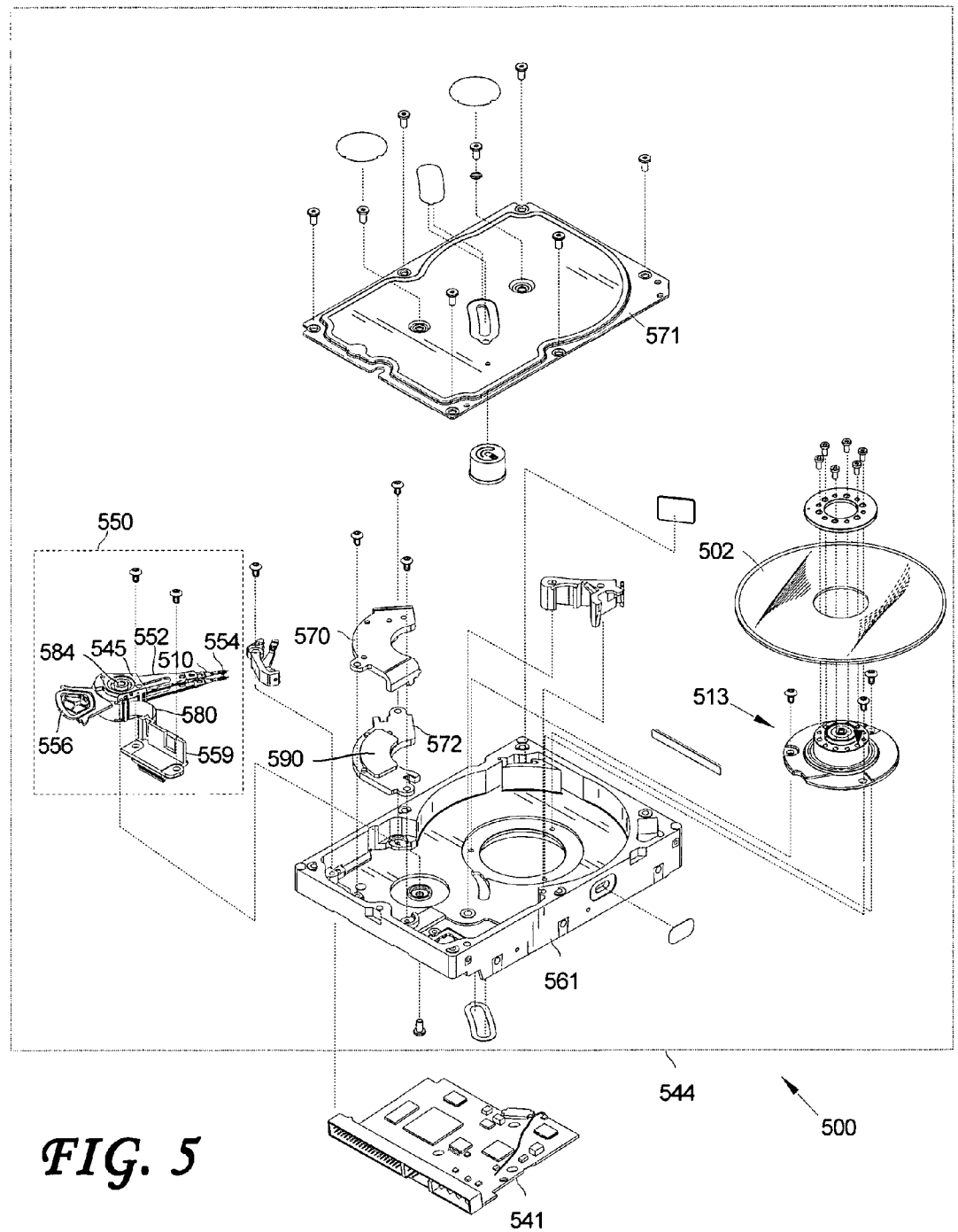
FIG. 5 is an exploded view of a head stack assembly and a disk drive constructed in accordance with an embodiment of the present invention.

FIG. 5 shows the principal components of an exemplary magnetic disk drive 500 constructed in accordance with an embodiment of the present invention. With reference to FIG. 5, the disk drive 500 comprises a HDA 544 and a PCBA 541. The HDA 544 includes a base 561 and a cover 571 attached to the base 561 that collectively house a disk 502 (or a stack of two or more such disks 502), a spindle motor 513 attached to the base 561 for rotating the disk 502, an HSA 550, and a pivot bearing cartridge 584 (such as a stainless steel pivot bearing cartridge, for example) that rotatably supports the HSA 550 on the base 561. The spindle motor 513 rotates the disk 502 at a constant angular velocity. The HSA 550 comprises a swing-type or rotary actuator assembly 552, at least one HGA 510 coupled to the load beam 303 that includes a flexure constructed as described above, and a flex circuit cable assembly. The rotary actuator assembly 552 includes a body portion, at least one actuator arm cantilevered from the body portion, and a coil portion 556 cantilevered from the body portion in an opposite direction from the actuator arm. The actuator arm supports the HGA 510 that, in turn, includes and supports the slider(s). The flex circuit cable assembly may include the flexible cable 580 and a flex clamp 559. The flexible cable 580 and the flexure of the HGA 510 are structured and coupled in the manner described above. The HSA 550 is pivotally secured to the base 561 via the pivot-bearing cartridge 584 so that the slider at the distal end of the HGA 510 may be moved over the surfaces of the disk(s) 502. The pivot-bearing cartridge 584 enables the HSA 550 to pivot about a pivot axis. The storage capacity of the HDA 544 may be increased by, for example, increasing the track density (the TPI) on the disk 502 and/or by including additional disks 502 in a disk stack and by an HSA 550 having a vertical stack of HGAs 510 supported by a rotary actuator assembly 552 having multiple actuator alms. The "rotary" or "swing-type" actuator assembly 552 rotates on the pivot bearing 584 cartridge about its pivot axis between limited positions and further includes a coil portion 556 that extends from one side of the body portion to interact with one or more permanent magnets 590 mounted to back irons 570, 572 to form a voice coil motor (VCM). The VCM causes the HSA 550 to pivot about the actuator pivot axis to cause the slider and the read-write transducers thereof to sweep radially over the disk(s) 502.

What is claimed is:

1. A suspension assembly for attachment to an actuator arm of a head stack assembly in a disk drive and for supporting a head, the suspension assembly comprising:
   a first end that includes a plurality of bond pads configured for electrical connection to the head;
   a second end that defines a tail configured for attachment to a flexible cable attached to the actuator arm assembly, the tail including:
      a support layer having a free end that defines a plurality of cutouts to form a plurality of peninsula-shaped regions, such that a plane oriented perpendicularly relative to the support layer and disposed between adjacent ones of the plurality of peninsula-shaped regions and extending beyond the free end of the tail does not cut through the support layer;
      a layer of insulating material disposed on the support layer;
      a plurality of connection pads, each being disposed on the layer of insulating material within a corresponding one of the plurality of peninsula-shaped regions;
      a plurality of conductive traces disposed on the layer of insulating material to electrically connect each of the plurality of connection pads to a corresponding one of the plurality of bond pads at the first end of the flexure.

2. A head gimbal assembly for a head stack assembly of a disk drive, the head stack assembly including a body portion and an actuator arm cantilevered from the body portion, the head gimbal assembly comprising:
   a head;
   a load beam coupled to the head stack assembly and to the head;
   a flexure at least partially supported by the load beam and including:
      a first end that includes a plurality of bond pads configured for electrical connection to the head;
      a second end that defines a tail configured for attachment to a flexible cable attached to the actuator arm assembly, the tail including:
         a support layer having a free end that defines a plurality of cutouts to form a plurality of peninsula-shaped regions, such that a plane oriented perpendicularly relative to the support layer and disposed between adjacent ones of the plurality of peninsula-shaped regions and extending beyond the free end of the tail does not cut through the support layer;
         a layer of insulating material disposed on the support layer;
         a plurality of connection pads, each being disposed on the layer of insulating material within a corresponding one of the plurality of peninsula-shaped regions;
         a plurality of conductive traces disposed on the layer of insulating material to electrically connect each of the plurality of connection pads to a corresponding one of the plurality of bond pads at the first end of the flexure, and a slider coupled to the plurality of bond pads for reading and writing to the disk.

3. A head stack assembly for a disk drive, the head stack assembly comprising:
   a body portion;
   an actuator arm cantilevered from the body portion;
   a head gimbal assembly supported by the actuator arm and including:
      a head;
      a load beam;
      a flexure at least partially supported by the load beam and including:
         a first end that includes a plurality of bond pads configured for electrical connection to the head;
         a second end that defines a tail configured for attachment to a flexible cable attached to the actuator arm assembly, the tail including:
            a support layer having a free end that defines a plurality of cutouts to form a plurality of peninsula-shaped regions, such that a plane oriented perpendicularly relative to the support layer and disposed between adjacent ones of the plurality of peninsula-shaped regions and extending beyond the free end of the tail does not cut through the support layer;
            a layer of insulating material disposed on the support layer;
            a plurality of connection pads, each being disposed on the layer of insulating material within a corresponding one of the plurality of peninsula-shaped regions;
            a plurality of conductive traces disposed on the layer of insulating material to electrically connect each of the plurality of connection pads to a corresponding one of the plurality of bond pads at the first end of the flexure, and
   a slider coupled to the plurality of bond pads for reading and writing to the disk.

4. A disk drive, comprising:
a disk;
a head stack assembly, comprising:
 a body portion;
 an actuator arm cantilevered from the body portion;
 a head gimbal assembly supported by the actuator arm and including:
  a head;
  a load beam;
  a flexure at least partially supported by the load beam and including:
   a first end that includes a plurality of bond pads configured for electrical connection to the head;
   a second end that defines a tail configured for attachment to a flexible cable attached to the actuator arm assembly, the tail including:
    a support layer having a free end that defines a plurality of cutouts to form a plurality of peninsula-shaped regions, such that a plane oriented perpendicularly relative to the support layer and disposed between adjacent ones of the plurality of peninsula-shaped regions and extending beyond the free end of the tail does not cut through the support layer;
    a layer of insulating material disposed on the support layer;
    a plurality of connection pads, each being disposed on the layer of insulating material within a corresponding one of the plurality of peninsula-shaped regions;
    a plurality of conductive traces disposed on the layer of insulating material to electrically connect each of the plurality of connection pads to a corresponding one of the plurality of bond pads at the first end of the flexure, and
 a slider coupled to the plurality of bond pads for reading and writing to the disk.

* * * * *